US011442233B2

(12) United States Patent
Zhu et al.

(10) Patent No.: US 11,442,233 B2
(45) Date of Patent: Sep. 13, 2022

(54) LOCKABLE OPTICAL CONNECTOR

(71) Applicant: HYC CO., LTD., Qingyuan (CN)

(72) Inventors: Lei Zhu, Qingyuan (CN); Haibo Yang, Qingyuan (CN)

(73) Assignee: HYC CO., LTD., Qingyuan (CN)

( * ) Notice: Subject to any disclaimer, the term of this patent is extended or adjusted under 35 U.S.C. 154(b) by 8 days.

(21) Appl. No.: 17/091,597

(22) Filed: Nov. 6, 2020

(65) Prior Publication Data

US 2022/0035102 A1 Feb. 3, 2022

(30) Foreign Application Priority Data

Jul. 28, 2020 (CN) .......................... 202010738119.4

(51) Int. Cl.
*G02B 6/38* (2006.01)
(52) U.S. Cl.
CPC .................... *G02B 6/389* (2013.01)
(58) Field of Classification Search
CPC ..................................................... G02B 6/389
See application file for complete search history.

(56) References Cited

U.S. PATENT DOCUMENTS

| 10,649,152 | B1* | 5/2020 | Yang ..................... G02B 6/3817 |
| 2021/0041641 | A1* | 2/2021 | Hu ........................ G02B 6/3831 |
| 2022/0003938 | A1* | 1/2022 | Van Baelen ......... G02B 6/3887 |

* cited by examiner

*Primary Examiner* — Sung H Pak
(74) *Attorney, Agent, or Firm* — Grossman, Tucker, Perreault & Pfleger, PLLC

(57) ABSTRACT

The present disclosure is directed to a lockable optical connector. The connector includes an adapter member, an inner frame member, an outer frame member, an annular compression member, and a lock member. The inner frame member non-rotatably couples to the adapter member. The outer frame member retains the coupling between the inner frame member and the adapter member and physically couples to the adapter member, to provide a first locking mechanism. The annular compression member is disposed proximate the outer frame member and the locking member couples to the external surface of the inner frame member, compressing the annular compression member against the outer frame member to provide a second locking mechanism. A sealing element may be disposed between the outer frame member and the adapter member and a sealing element may be disposed between the outer frame member and the inner frame member to provide a weather-proof and water-tight lockable optical connector.

20 Claims, 11 Drawing Sheets

LOCKABLE OPTICAL CONNECTOR

CROSS-REFERENCE TO RELATED APPLICATIONS

This application claims the benefit of Chinese Patent Application No. 202010738119.4, filed with the Chinese Patent Office on Jul. 28, 2020, the disclosure of which is incorporated herein by reference in its entirety.

TECHNICAL FIELD

The present disclosure relates to connector devices used in fiber optic transmission systems, more particularly, the present disclosure relates to optical connector devices that include one or more locking mechanisms.

BACKGROUND

With increasing emphasis being placed on telephone services for the transport and delivery of voice, video, and data, the traditional (i.e., copper based) infrastructure is rapidly being superseded by fiber optic infrastructure that offers greater bandwidth and reduced losses. The efficiency and reliability of fiber networks depends on a number of factor, such as the quality of connections between cable segments, network equipment devices, and other cable segments. The ubiquity of telecommunications equipment in commerce, in the home, in industry, and in vehicles subjects the telecommunications equipment to harsh environments that experience extreme fluctuations in temperature, humidity, vibration, and impact. Connections between optical fibers can be come inadvertently separated or misaligned compromising the efficiency and/or reliability of communications carried by the fiber. In addition, the connection between fibers may be adversely affected by the ingress of dust, dirt, moisture, and other contaminants. Fiber optic networks are particularly vulnerable because of the precise termination and alignment between connected components and cable segments. Thus, an improved optical connector capable of providing a secure connection while minimizing or eliminating the ingress of contaminants, dust, and moisture would improve the efficiency and reliability of fiber optic networks.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
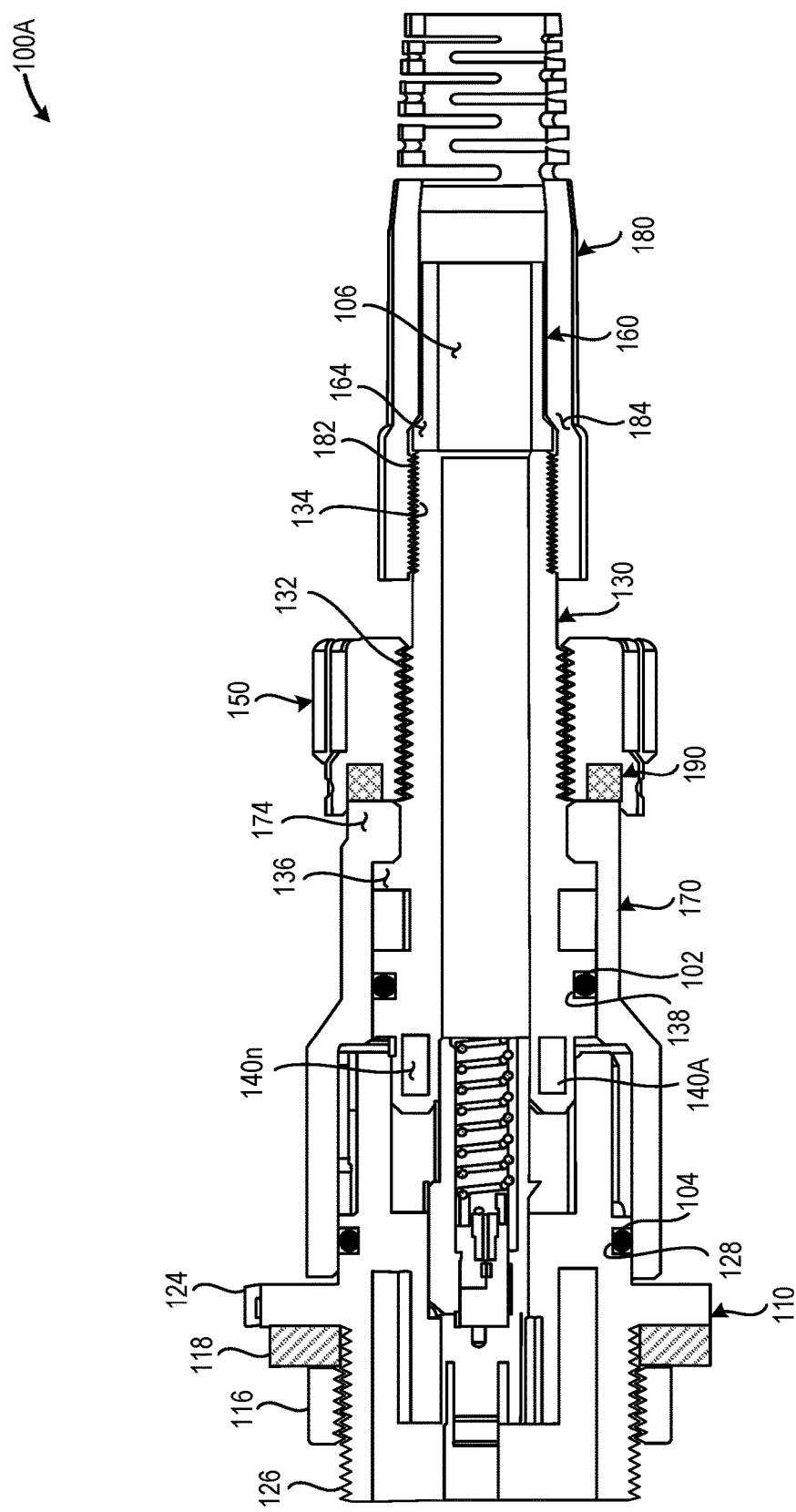
FIG. 1A is a sectional view of an illustrative assembled lockable optical connector depicting the relationship between an adapter member, an inner frame member, a lock member, an outer frame member, and an annular compression member, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems disclosed herein beneficially and advantageously permit the secure coupling of optical fiber cables using locking and sealing devices to limit or prevent the ingress of insects, contaminants, dust, and moisture. In addition, the systems disclosed herein physically couple the optical cable to the optical connector, beneficially minimizing the likelihood of loosening or misalignment of the connector. The systems and methods disclosed herein are readily adaptable to any type of optical cable connector. Although discussed in terms of a Multi-fiber Push On (MPO) connector for clarity and ease of discussion, those of ordinary skill in the relevant arts will readily appreciate that the systems described herein may be adapted to other currently available and future developed connector types such as Standard Connector (SC); Ferrule Connector (FC); ST Connector; SMA Connector; Lucent Connector (LC), Enterprise Systems Connection Connector (ESCON); Fiber Distributed Data Interface Connector (FDDI); Opti-jack/RJ- 45 Connector; LX-5 Connector; MT-RJ Connector; MU Connectors; E2000 Connectors FC, DIN, D4, SMA. The lockable connection systems disclosed herein may be adapted to lock a plug or male-type connector to a receptacle or female-type connector.

In the systems disclosed herein, one or more optical connectors are disposed in an adapter member. An inner frame member physically couples to the adapter member and is prevented from rotating with respect to the adapter member via one or more projections extending from the end of the inner frame member that engage corresponding recesses in the adapter member. An outer frame member slides over at least a portion of the inner frame member. The outer frame member couples to the adapter member, and one or more surface features on the internal surface of the outer frame member trap the inner frame member proximate the adapter member. The outer frame member includes one or more attachment features, such as a bayonet lug, to physically couple the outer frame member to the adapter member. Sealing elements positioned between the adapter member and the outer frame member and between the inner frame member and outer frame member provide a weather-proof, water-tight seal that prevents the incursion of dirt, dust, insects, and other contaminants into the adapter member. An annular compression member is positioned about the external surface of the inner frame member and proximate the outer frame member. A lock member attaches to the external surface of the inner frame member and compresses the annular compression member against the outer frame member. Thus, the optical connector is assembled using the different locking mechanisms—a bayonet attachment feature attaches the outer frame member to the adapter member and the lock member compresses the outer frame member thereby preventing the disengagement of the outer frame member from the adapter member. A crimp ring member retains the optical cable in the lockable optical connector. A tail cover member minimizes the likelihood of damage from bending, kinking, or folding of the optical cable.

A lockable optical connector is provided. The lockable optical connector may include: an adapter member having an internal surface and an external surface; an inner frame member coupleable to the adapter member, the inner frame member having a plurality of protrusions extending longitudinally from the first end of the inner frame member, each of the plurality of protrusions insertable into a respective one of a corresponding plurality of receivers formed in the adapter member; a lock member coupleable to the inner frame member; an outer frame member disposable about at least a portion of an external surface of the inner frame member, a first end of the outer frame member coupleable to a first end of the adapter member to provide a first locking device, the outer frame member including a raised internal surface feature to engage an external surface feature on the external surface of the inner frame member; and an annular compression member disposed about the external surface of the inner frame member and positioned between the outer frame member and the lock member such that when assembled, the compression member is proximate a second end of the outer frame member and the lock member to provide a second locking device.

Another lockable optical connector is also provided. The lockable optical connector may include: an inner frame member having an external surface, a first end, a second end, and a longitudinal cavity formed therethrough, the inner frame member including: a plurality of protrusions extending longitudinally from the first end of the inner frame member; an adapter member having an external surface, a first end, a second end, and a longitudinal cavity formed therethrough, the adapter member including: a raised collar extending circumferentially about an external perimeter of the adapter member; and a plurality of recesses formed in the first end of the adapter member, each of the plurality of recesses to accept the insertion of a corresponding one of the plurality of protrusions extending from the second end of the inner frame member; an outer frame member having an external surface, a first end, a second end, and a longitudinal cavity formed therethrough, the outer frame member disposable about at least a portion of the external surface of the inner frame member and detachably attachable to the adapter member; an annular compression member disposable about the external surface of the inner frame member; and a lock member detachably attachable to the external surface of the inner frame member, the lock member to trap the outer frame member about at least a portion of the external surface of the inner frame member such that, when assembled, the first end of the outer frame member is proximate the raised collar of the adapter member and the second end of the outer frame member is proximate the compression member.

As used herein, the term "physical geometry" and the term "physical configuration" refers to a three dimensional (3D) structure that may include a solid structure (e.g., a cylindrical solid or spherical solid); an open structure (e.g., a lattice structure such as a helix); or any combination thereof.

Figure 1B:
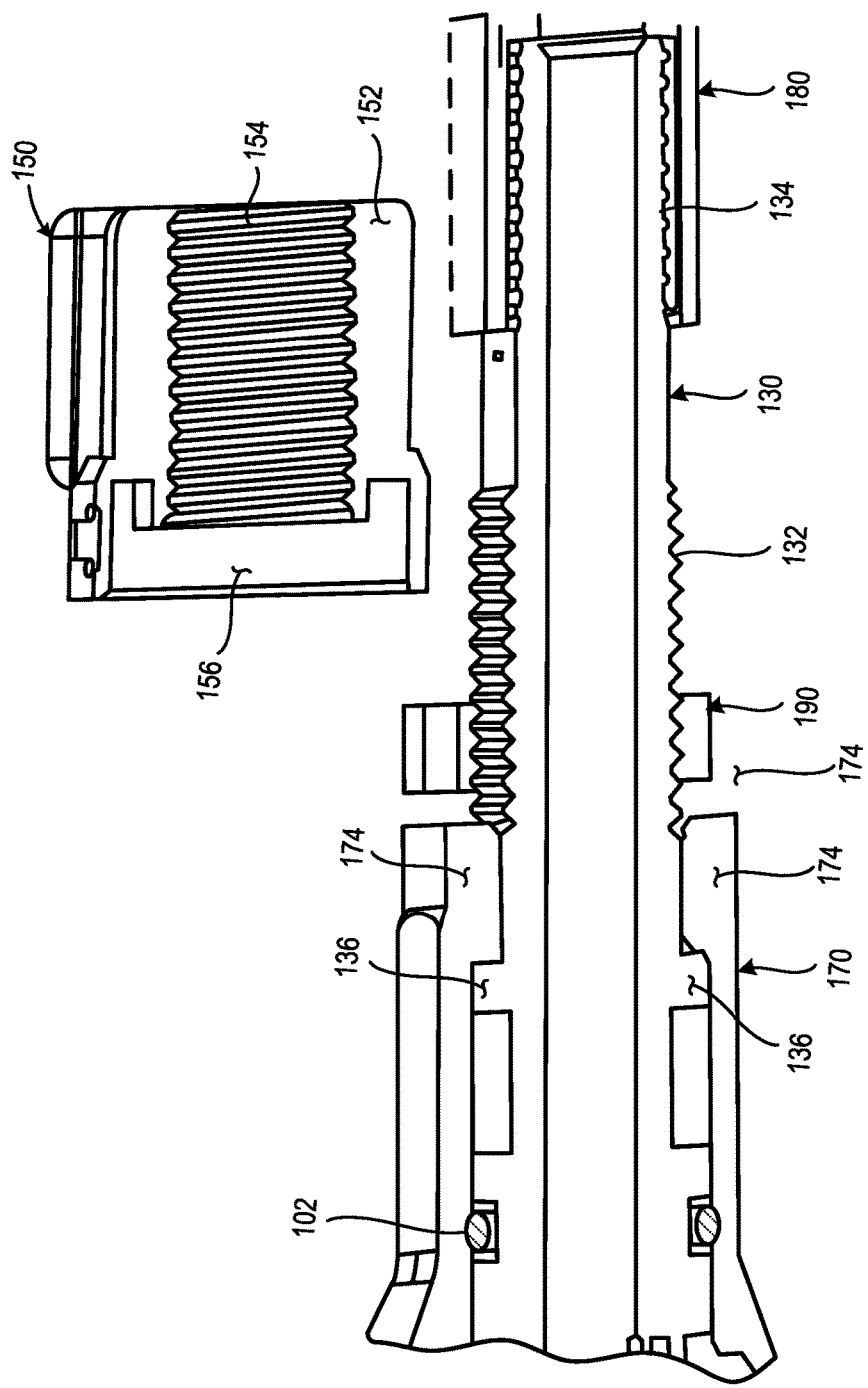
FIG. 1B is a perspective sectional view of the illustrative lockable optical connector in FIG. 1A depicting the relationship between the inner frame member, the outer frame member, and the annular compression member, in accordance with at least one embodiment described herein.
Figure 1C:
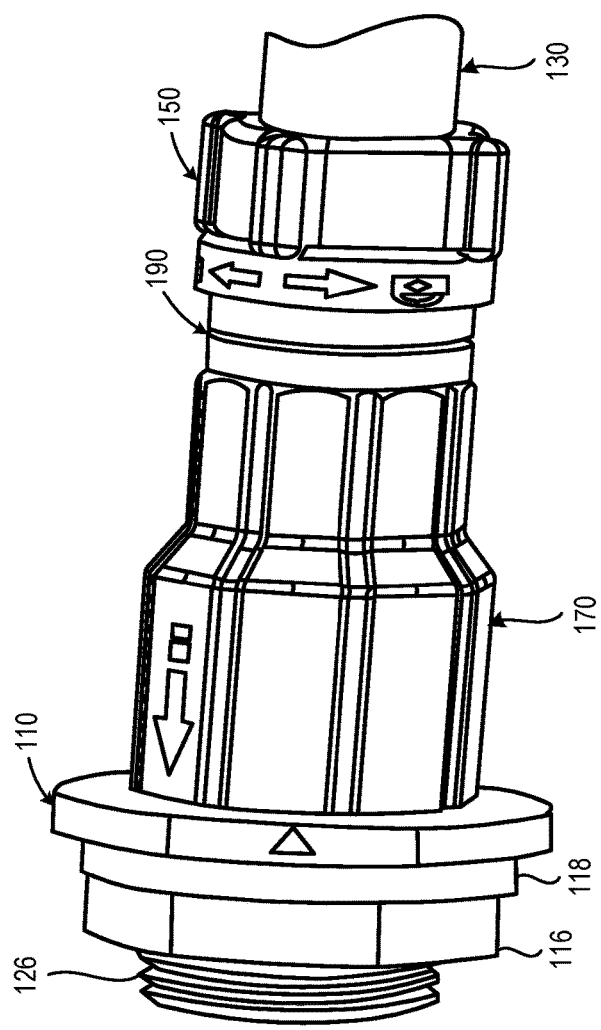
FIG. 1C is an external perspective view of the illustrative assembled lockable optical connector in FIG. 1A depicting the relationship between the adapter member, the inner frame member, the lock member, the outer frame member, and the annular compression member, in accordance with at least one embodiment described herein.
Figure 1D:
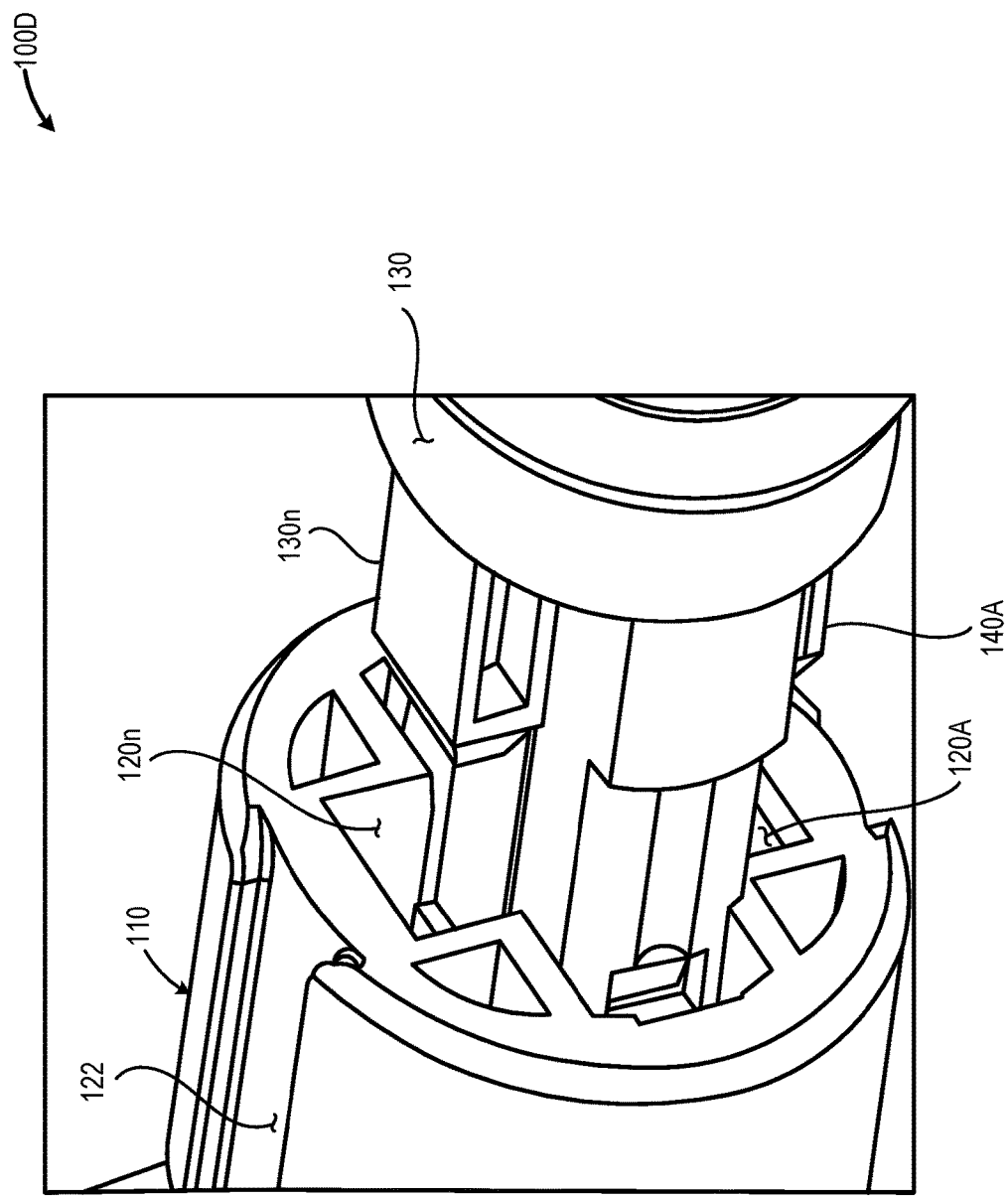
FIG. 1D is a perspective view of an illustrative coupling system between the adapter member and the inner frame member of the illustrative assembled lockable optical connector depicted in FIG. 1A.
Figure 1E:
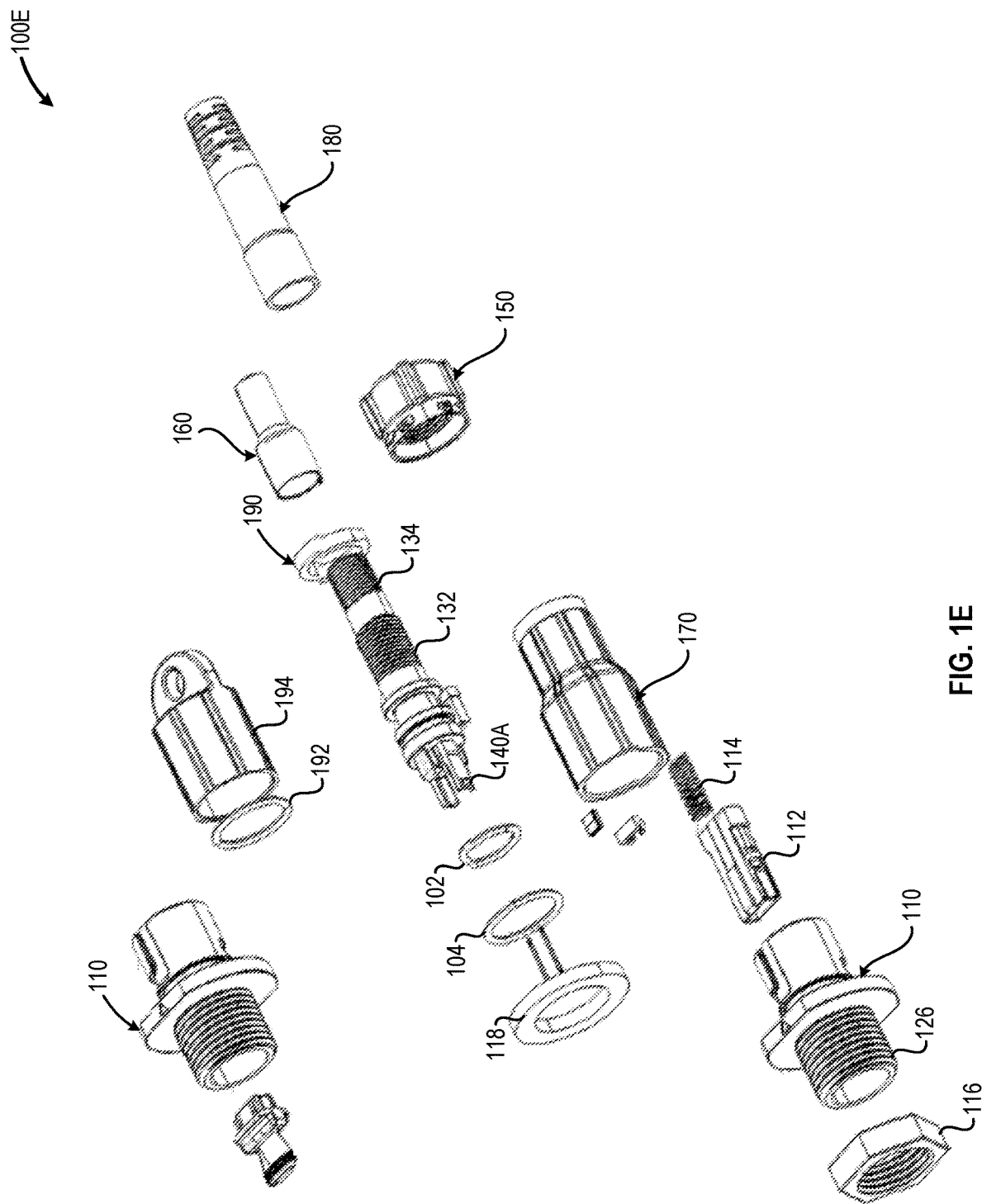
FIG. 1E is an exploded view of the illustrative assembled lockable optical connector in FIG. 1A depicting each of the components used in the construction of the optical connector, in accordance with at least one embodiment described herein.

FIGS. 1A, 1B, 1C, 1D, and 1E depict an illustrative lockable connector 100. FIG. 1A is a sectional view of an illustrative assembled lockable optical connector 100 depicting the relationship between an adapter member 110, an inner frame member 130, a lock member 150, an outer frame member 170, and an annular compression member 190, in accordance with at least one embodiment described herein. FIG. 1B is a perspective sectional view of the illustrative lockable optical connector 100 depicting the relationship between the inner frame member 130, the outer frame member 170, and the annular compression member 190, in accordance with at least one embodiment described herein. FIG. 1C is an external perspective view of the illustrative assembled lockable optical connector 100 depicting the relationship between the adapter member 110, the inner frame member 130, the lock member 150, the outer frame member 170, and the annular compression member 190, in accordance with at least one embodiment described herein. FIG. 1D is a perspective view of an illustrative coupling system between the adapter member 110 and the inner frame member 130 of the illustrative assembled lockable optical connector depicted in FIG. 1A. FIG. 1E is an exploded view of the illustrative assembled lockable optical connector 100 depicting each of the components used in the construction of the optical connector 100, in accordance with at least one embodiment described herein.

Referring collectively to FIGS. 1A-1E, the lockable optical connector 100 includes an interior channel 106 that terminates at one or more optical connectors 112 disposed at least partially within the adapter member 110. An optical cable may be routed through the interior channel 106 of the lockable optical connector 100 and may be terminated at the one or more optical connectors 112. As depicted in FIG. 1A, the adapter member 110 may include a hollow, generally cylindrical member having a first end disposed proximate the inner frame member 130 and an open end to accommodate the insertion and/or coupling of an external optical cable. The inner frame member 130 may include a hollow, generally cylindrical member having a first end disposed proximate the adapter member 110 and an opposed second end disposed proximate a crimp ring member 160. The inner frame member 130 couples to the adapter member 110. In at least some embodiments, one or more attachment features 140A-140n (collectively, "attachment features 140") may extend longitudinally from the first end of the inner frame member 130. Each of the one or more attachment features 140A-140n extending from the first end of the inner frame member 130 may be received in a corresponding one or more attachment features 120A-120n (collectively, "attachment features 120") carried by the adapter member 110 to physically couple the inner frame member 130 to the adapter member 110 and thereby prevent rotation of the inner frame member 130 with respect to the adapter member 110.

The adapter member 110 may include a hollow, generally cylindrical member having a first end disposed proximate the inner frame member 130 and an open second end to accommodate the passage of one or more single- or multi-fiber optical cables. The first end of the adapter member 110 includes the one or more attachment features 120A-120n to engage one or more complimentary attachment features 140A-140n disposed in, on, or about at least a portion of the first end of the inner frame member 130. In at least some embodiments, the one or more attachment features 120 may include a plurality of sockets or similar open structures disposed, formed, or otherwise attached to the internal surface of the adapter member 110 and the one or more complimentary attachment features 140 may include a plurality of projections or similar raised structure disposed, formed, or otherwise attached to the first end of the inner frame member 130. In embodiments, the second end of the adapter member 110 may include one or more attachment features 126 to permit the detachable or permanent physical attachment of the lockable optical connector 100 to an external device or system, such as an equipment housing. In at least some embodiments, the one or more attachment features 126 may include a plurality of male or female threads, such as the plurality of male threads depicted in FIGS. 1A-1E. In some implementations, one or more coupling nuts 116 and one or more weatherproof gaskets 118 may be threadedly coupled to the second end of the adapter member 110. In at least some instances, the surface feature 138 includes a circumferential groove formed about the external perimeter of the inner frame member 130. In embodiments, the one or more first sealing devices 102 may include one or more elastomeric members, such as an "O"-ring, or similar sealing device. In embodiments, the one or more first sealing devices 102 may include one or more packing rings, one or more lip seals, or similar.

In embodiments, the adapter member 110 may include one or more surface feature disposed in, on, or about the external surface of the adapter member 110. In some embodiments, the adapter member 110 a raised circumferential collar 124 disposed about the external perimeter of the adapter member 110. For example, as depicted in FIGS. 1A-1E, in some embodiments the adapter member 110 includes a raised circumferential collar 124 disposed about the external perimeter of the adapter member 110. The adapter member 110 accommodates the disposal of one or more optical connectors 112 disposed in whole or in part within an internal space of the adapter member 110. In embodiments, a biasing element 114 may be disposed between the first end of the inner frame member 130 and the one or more optical connectors 112 to bias the one or more optical connectors 112 toward the second end of the adapter member 110. As depicted in FIGS. 1A-1E, in some embodiments, the biasing element 114 may include a helical coil spring. In embodiments, the adapter member 110 may include one or more surface features 128 to accommodate the at least a portion of one or more second sealing devices 104 to form a weather-proof and water-tight seal between the external surface of the adapter member 110 and the internal surface of the outer frame member 170. In at least some instances, the surface feature 128 includes a circumferential groove formed about the external perimeter of the adapter member 110. In embodiments, the one or more second sealing devices 104 may include one or more elastomeric members, such as an "O"-ring, or similar sealing device. In embodiments, the one or more second sealing devices 104 may include one or more packing rings, one or more lip seals, or similar.

Referring to FIG. 1E, in embodiments, one or more plug members 112' may be inserted into the one or more optical connectors 112 disposed in the adapter member 110. In embodiments, the plug member 112' may include either a male plug member, a female plug member, or any combination thereof. In addition, in some embodiments, a cap member 194 may be disposed proximate the second end of the adapter member 110 to protect the optical connector prior to installation of the lockable optical connector 100. In some implementations a sealing member, such as a gasket, may be disposed between the cap member and the adapter member 110.

The inner frame member 130 may include a hollow, generally cylindrical member having a first end disposed proximate the first end of the adapter member 110 and an opposed second end disposed proximate a crimp ring member 160. In embodiments, the inner frame member 130 may include a number of surface features including a first attachment fixture 132 to couple the lock member 150 to the external surface of the inner frame member 130; a second attachment fixture 134 to couple the tail cover member 180 to the external surface of the inner frame member 130; a surface feature 136 to engage a complimentary surface feature 174 disposed in an internal surface of the outer frame member 170; and a surface feature 138 to accommodate a first sealing device 102.

The first attachment fixture 132 may include any number and/or combination of currently available or future developed devices capable of facilitating the detachable attachment of the lock member 150 to the external surface of the inner frame member 130. In at least some embodiments, the first attachment fixture 132 may include a plurality of male threads disposed on at least a portion of the external surface of the inner frame member 130.

The second attachment fixture 134 may include any number and/or combination of currently available or future developed devices capable of facilitating the detachable attachment of the tail cover member 180 to the external surface of the inner frame member 130. In at least some embodiments, the second attachment fixture 134 may include a plurality of male threads disposed on at least a portion of the external surface of the inner frame member 130.

The surface feature 136 may include any number and/or combination of currently available or future developed devices capable of engaging one or more complimentary surface features formed in, on, or about at least a portion of the internal surface of the outer frame member 170. In at least some embodiments, the surface feature includes a continuous or segmented raised circumferential collar 134 disposed about the external perimeter of the inner frame member 130.

The surface feature 138 may include any number and/or combination of currently available or future developed features capable of accommodating and/or at least partial engagement of one or more first sealing devices 102. In at least some instances, the surface feature 138 includes a circumferential groove formed about the external perimeter of the inner frame member 130. In embodiments, the one or more first sealing devices 102 may include one or more elastomeric members, such as an "O"-ring, or similar sealing device. In embodiments, the one or more first sealing devices 102 may include one or more packing rings, one or more lip seals, or similar.

In at least some implementations, the outer frame member 170 includes a hollow, generally cylindrical member having a first end disposed proximate a raised circumferential collar 124 disposed about the external perimeter of the adapter member 110 and an opposed second end disposed proximate the annular compression member 190. In embodiments, a raised circumferential collar 174 disposed about the internal perimeter of the outer frame member 170 contacts, engages, and/or falls proximate a raised circumferential collar 134 disposed about the external perimeter of the inner frame member 130.

In embodiments, the outer frame member 170 includes one or more attachment features (not visible in FIGS. 1A-1E) disposed, attached, or otherwise formed, or in, on, about, or across at least a portion of the internal surface of the outer frame member 170. In embodiments, the one or more attachment features disposed on the internal surface of the outer frame member 170 may include a raised attachment feature, such as a bayonet mounting lug. In other embodiments the one or more attachment features disposed on the internal surface of the outer frame member 170 may include a recessed surface feature, such as a bayonet mounting groove. Referring to FIG. 1D, in embodiments, the adapter member 110 may include one or more attachment features 122 disposed, attached, or otherwise formed, or in, on, about, or across at least a portion of the external surface of the adapter member 110. In embodiments, the one or more attachment features 122 on the external surface of the adapter member engage the one or more attachment features on the internal surface of the outer frame member 170 to physically couple the adapter member 110 to the outer frame member 170. In at least one embodiment, the one or more attachment features 122 on the external surface of the adapter member 110 may include a bayonet-type attachment groove to accept the insertion of a raised bayonet-type attachment lug disposed on the internal surface of the outer frame member 170. In at least some embodiments, the one or more attachment features 122 on the external surface of the adapter member 110 may include an "L"-shaped bayonet attachment groove and the one or more attachment features on the internal surface of the outer frame member 170 may include one or more bayonet-type attachment lugs to engage the "L"-shaped bayonet attachment groove. In some implementations one or more visual indicators may be formed in or otherwise disposed on the adapter member 110 and/or the outer frame member 170 to designate the location of the attachment feature on the adapter member 110 and/or the outer frame member 170.

One or more first sealing devices 102 are disposed between the inner frame member 130 and the internal surface of the outer frame member 170. One or more second sealing devices 104, are disposed between the external surface of the adapter member 110 and the internal surface of the outer frame member 170. Together, the one or more first sealing devices 102 and the one or more second sealing devices 104 beneficially provide a weatherproof and waterproof seal that prevents the ingress of dirt, dust, insects, and other contaminants into the adapter member 110 housing the one or more optical connectors 112.

The lock member 150 includes any number and/or combination of systems and/or devices capable of physically coupling to at least a portion of the external surface of the inner frame member 130. In at least some implementations, the lock member 150 includes a hollow, generally cylindrical member 152 having a first end disposed proximate the compression member 190 and an opposed second end. Although the lock member 150 is depicted as including a plurality of female threads 154, the method of physical coupling of the lock member 150 to the inner frame member is not limited to a threaded connection. For example, the lock member 150 may physically couple to the inner frame member using one or more compression fittings, one or more cam-lock fittings or similar. In some embodiments, a recess or void space 156 may be formed in the first end of the lock member 150 to accommodate the insertion of at least a portion of the compression member 190 in the first end of the lock member 150. The lock member 150 physically couples to the external surface of the inner frame member 130 compressing the raised circumferential collar 174 disposed about the internal perimeter of the outer frame member 170 against the raised circumferential collar 136 disposed about the external perimeter of the inner frame member 130. In embodiments, the lock member 150 may include one or more features, such as one or more surface features, to assist with positioning or tightening the lock member against the compression member 190 and/or the outer frame member 170.

The compression member 190 may include any number and/or combination of systems or devices capable of transmitting a compressive force applied by the lock member 150 to the outer frame member 170. In embodiments, the compression member 190 may include a single or multi-piece member fabricated using a metallic material, such as stainless steel, alloys of stainless steel, aluminum, aluminum containing alloys, and similar. In other embodiments, the compression member 190 may include a single or multi-piece member fabricated using a non-metallic material such as high-density polyethylene (HDPE), carbon fiber, or similar. In embodiments, the compression member 190 may have any physical geometry and/or configuration. As depicted in FIGS. 1A-1E, in at least some embodiments, the compression member 190 may include a flat, annular, disc-shaped, member having a first flat surface proximate the outer frame member 170 and an opposed second flat surface proximate the lock member 150.

A single- or multi-fiber optical cable is routed through the channel 106 formed through the inner frame member 130. The optical fibers included in the optical cable are terminated at the one or more optical connectors 112 disposed at least partially within the adapter member 110. The lockable optical connector 100 includes a tail cover member 180 disposed over a crimp ring member 160. The tail cover member 180 includes one or more attachment features 182 to physically couple the tail cover member 180 to the second attachment fixture 134 disposed on the external surface of the inner frame member 130. In embodiments, a plurality of female threads disposed on at least a portion of the internal surface of the tail cover member 180 may threadedly couple to a plurality of male threads that provide the second attachment fixture 134. The crimp ring member 160 may be fabricated using a deformable material such that when the tail cover member 180 is affixed to the inner frame member 130, a surface feature 184, such as a circumferential ramp or ridge affixed, formed, or otherwise disposed in, on, or about the internal surface of the tail cover member 180 contacts one or more surface features 164 formed, or otherwise disposed in, on, or about the external surface of the crimp ring member 160, causing the crimp ring member 160 to deform and physically compress an optical cable disposed in the channel 106. In embodiments, the tail cover member 180 protects an optical cable by limiting the flex of the optical cable proximate the lockable optical connector 100.

In operation, a single- or multi-fiber optical cable is passed through channel 106 formed in the tail cover member 180, the crimp ring member 160, the lock member 150, the compression member 190, the inner frame member 130 and the biasing element 114. The one or more optical connectors 112 are physically and operationally coupled to a single- or multi-fiber optical cable and the one or more optical connectors 112 disposed at least partially within an internal space within the adapter member 110. In embodiments, the internal space within the adapter member 110 is configured to prevent the rotation of the one or more optical connectors 112 with respect to the adapter member 110 (i.e., the one or more optical connectors 112 remain in a fixed location with respect to the adapter member.

The biasing element 114 is positioned between the one or more optical connectors 112 and the first end of the inner frame member 130. Each of the one or more attachment features 140A-140n extending from the first end of the inner frame member 130 are inserted into one or more complimentary attachment features 120A-120n formed in, on, or about the first end of the adapter member 110. The one or more first sealing elements 102 are disposed in, on, or about the surface feature formed in the external surface of the inner frame member 130 and the one or more second sealing elements 104 are disposed, in whole or in part, in, on, or about the surface feature 138 formed in the external surface of the adapter member 110. The outer frame member 170 is then positioned over the adapter member 110 and the inner frame member 130. The one or more attachment features on the internal surface of the outer frame member 170 are physically coupled to the one or more attachment features 122 on the external surface of the adapter member 110 to physically couple the adapter member 110 to the outer frame member 170. In at least some embodiments, a twist of the outer frame member 170 "locks" the outer frame member 170 to the adapter member 110. Upon physically coupling the outer frame member 170 to the adapter member 110, the one or more first sealing elements 102 and the one or more second sealing elements 104 provide a weather-tight, waterproof, seal between the adapter member 110, the inner frame member 130 and the outer frame member 170. The compression member 190 is positioned against the second end of the outer frame member 170 and the lock member 150 affixed to the first attachment feature 132, compressing the raised circumferential collar 174 disposed about the internal perimeter of the outer frame member 170 against the raised circumferential collar 136 disposed about the external perimeter of the inner frame member 130.

Finally, the tail cover member 180 is positioned over the crimp ring member 160 and the one or more attachment features 182 physically couple the tail cover member 180 to the second attachment fixture 134 disposed on the external surface of the inner frame member 130. As the tail cover member 180 is affixed to the second attachment fixture 134, The surface feature 184 contacts one or more surface features 164 on the external surface of the crimp ring member 160, causing the crimp ring member 160 to deform and physically compress against the optical cable disposed in the channel 106.

Figure 2A:
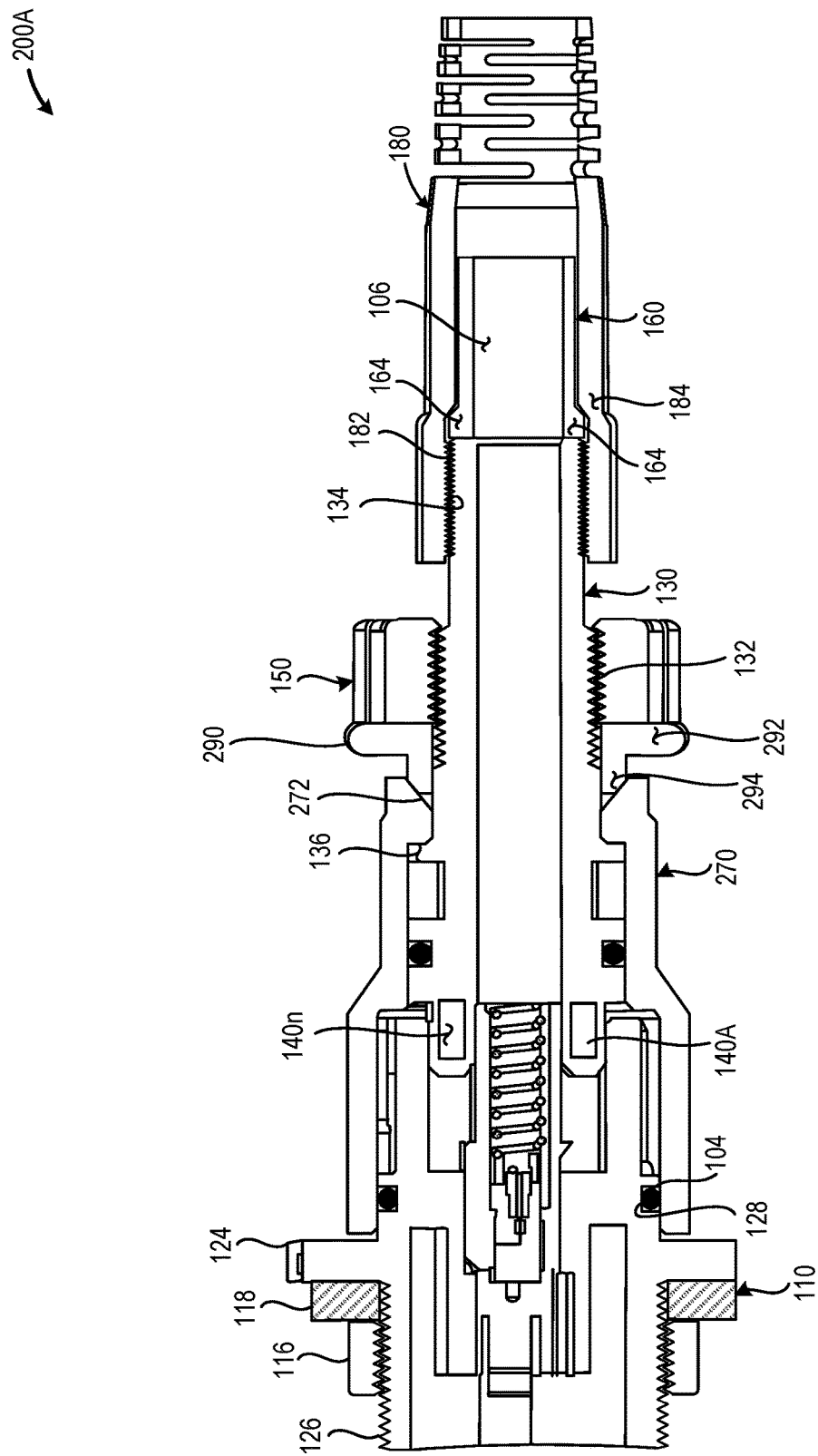
FIG. 2A is a cross-sectional view of the illustrative assembled lockable optical connector 200 depicting the relationship between an adapter member, an inner frame member, a lock member, a tapered-end outer frame member, and a tapered annular compression member, in accordance with at least one embodiment described herein.
Figure 2B:
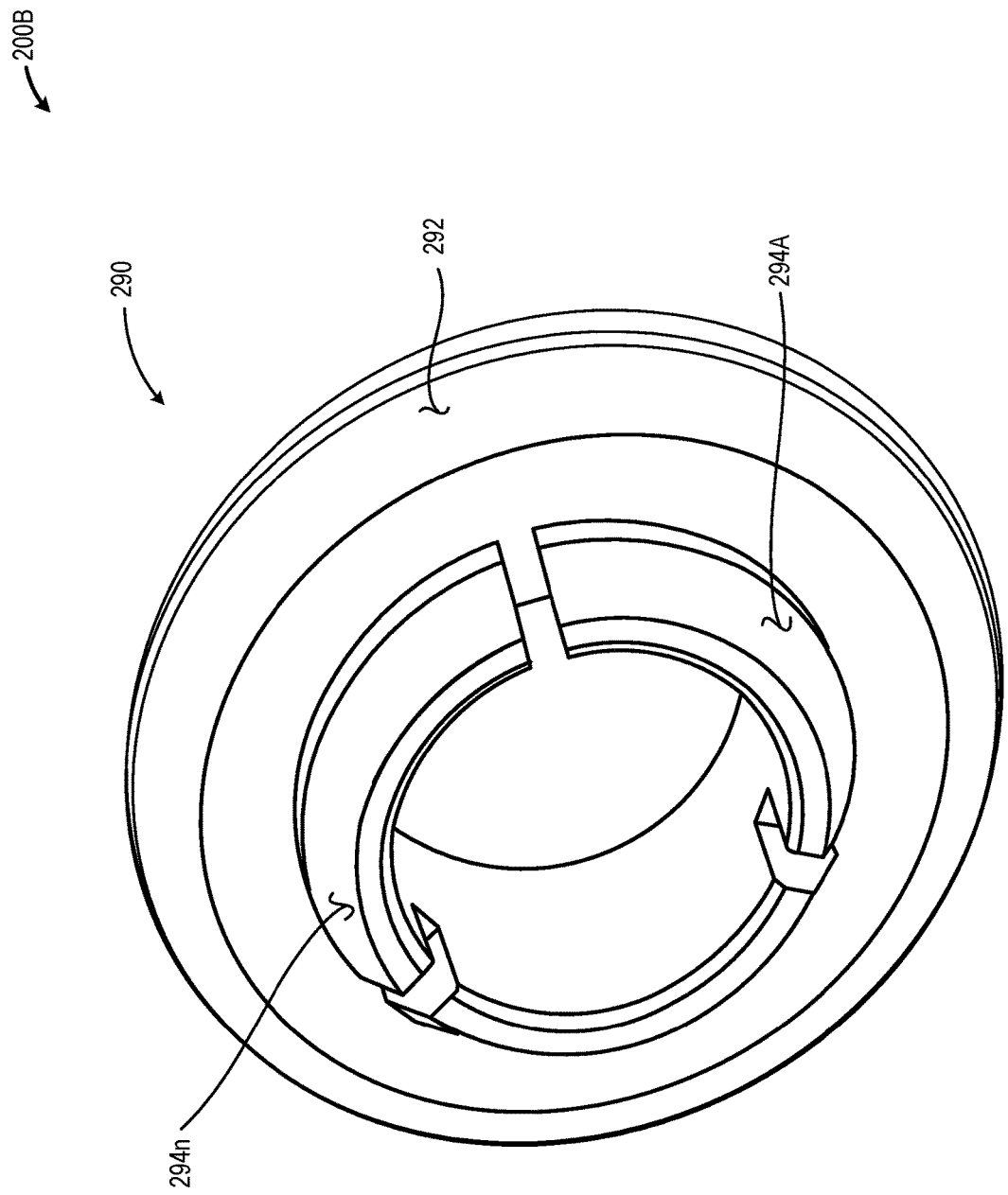
FIG. 2B is a perspective view of an illustrative tapered annular compression member, in accordance with at least one embodiment described herein.
Figure 2C:
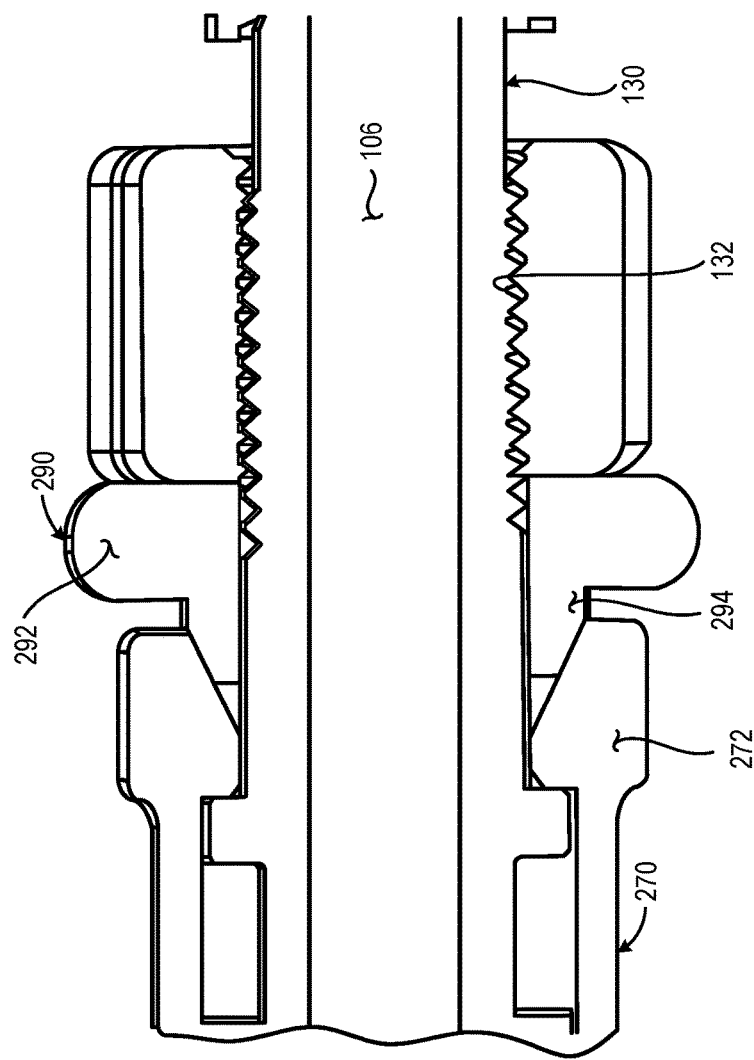
FIG. 2C is an cross-sectional view depicting the relationship between the tapered annular compression member and the tapered-end outer frame member, in accordance with at least one embodiment described herein.
Figure 2D:
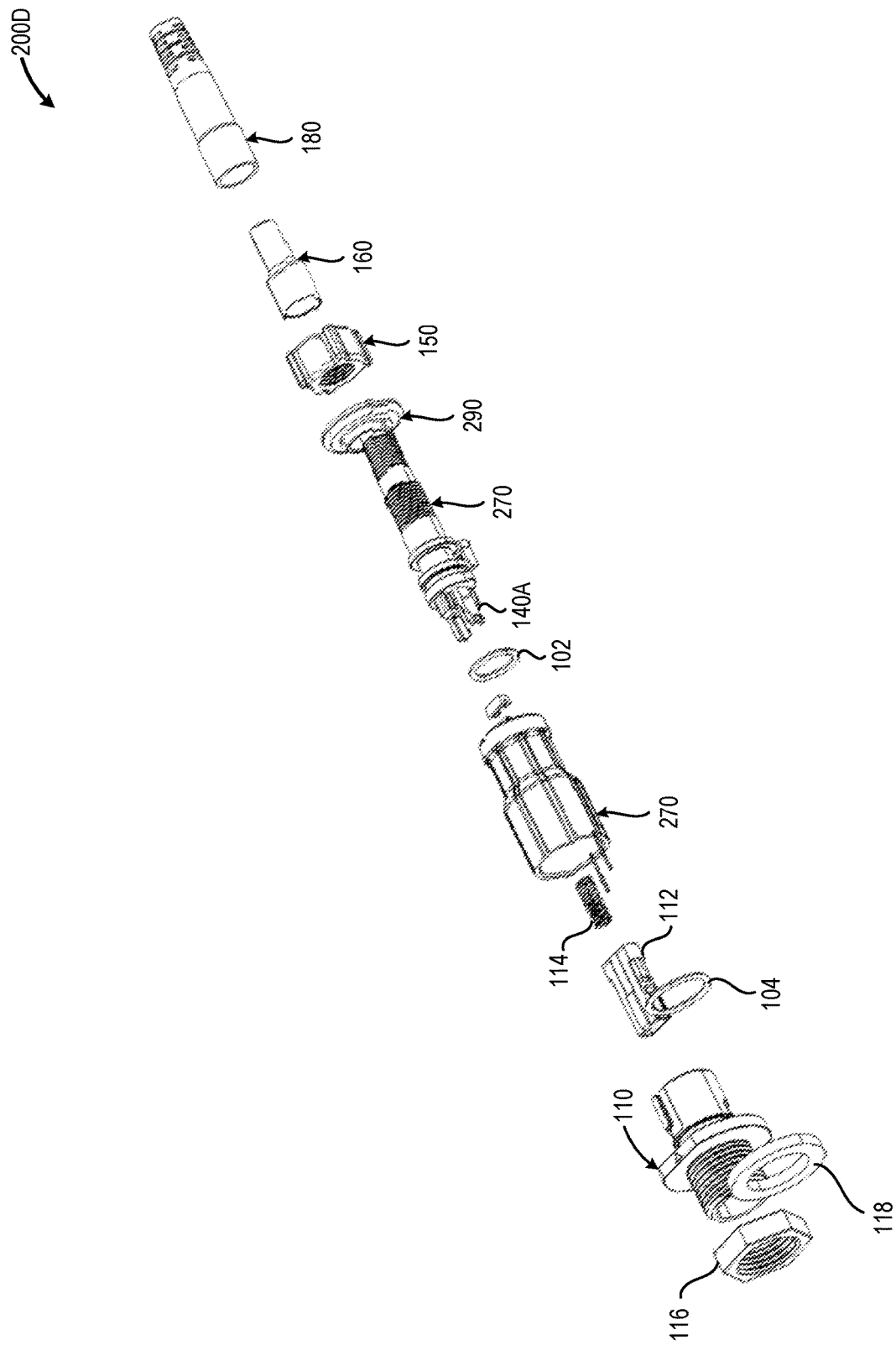
FIG. 2D is an exploded view of the illustrative assembled lockable optical connector in FIG. 2A depicting each of the components used in the construction of the optical connector, in accordance with at least one embodiment described herein.

FIGS. 2A, 2B, 2C, and 2D depict another illustrative lockable connector 200. FIG. 2A is a cross-sectional view of the illustrative assembled lockable optical connector 200 depicting the relationship between an adapter member 110, an inner frame member 130, a lock member 150, a tapered-end outer frame member 270, and a tapered annular compression member 290, in accordance with at least one embodiment described herein. FIG. 2B is a perspective view of the illustrative tapered annular compression member 290, in accordance with at least one embodiment described herein. FIG. 2C is an cross-sectional view depicting the relationship between the tapered annular compression member 290 and the tapered-end outer frame member 270, in accordance with at least one embodiment described herein. FIG. 2D is an exploded view of the illustrative assembled lockable optical connector 200 depicting each of the components used in the construction of the lockable optical connector 200, in accordance with at least one embodiment described herein.

Referring collectively to FIGS. 2A-2D, in some embodiments rather than the "flat" annular compression member 190 depicted in FIGS. 1A-1E, a tapered annular compression member 290 and a tapered-end outer frame member 270 having a complimentary tapered second end proximate the tapered annular compression member may be substituted. As depicted in FIGS. 2A-2D, in some embodiments, the tapered annular compression member 290 may include a generally cylindrical body portion 292 and one or more single- or multi-piece tapered portions 294 extending from the tapered compression member 290 towards a complimentary tapered second end 272 of the tapered-end outer frame member 270. As the lock member 150 is tightened, the tapered portion 294 of the tapered annular compression member 290 is compressed against the tapered second end 272 of the outer frame member 270.

Referring to FIG. 2B, in some embodiments, the tapered annular compression member 290 may include a single cylindrical body portion 292 and a plurality of tapered sections 294A-294n (collectively, "tapered sections 294") extending from the cylindrical body portion 292. In embodiments, the angle between the tapered portions and the face of the cylindrical body portion 292 may vary from about 15° to about 75°. In one or more embodiments, the angle between the tapered portions and the face of the cylindrical body portion 292 may be about 45°.

Figure 3A:
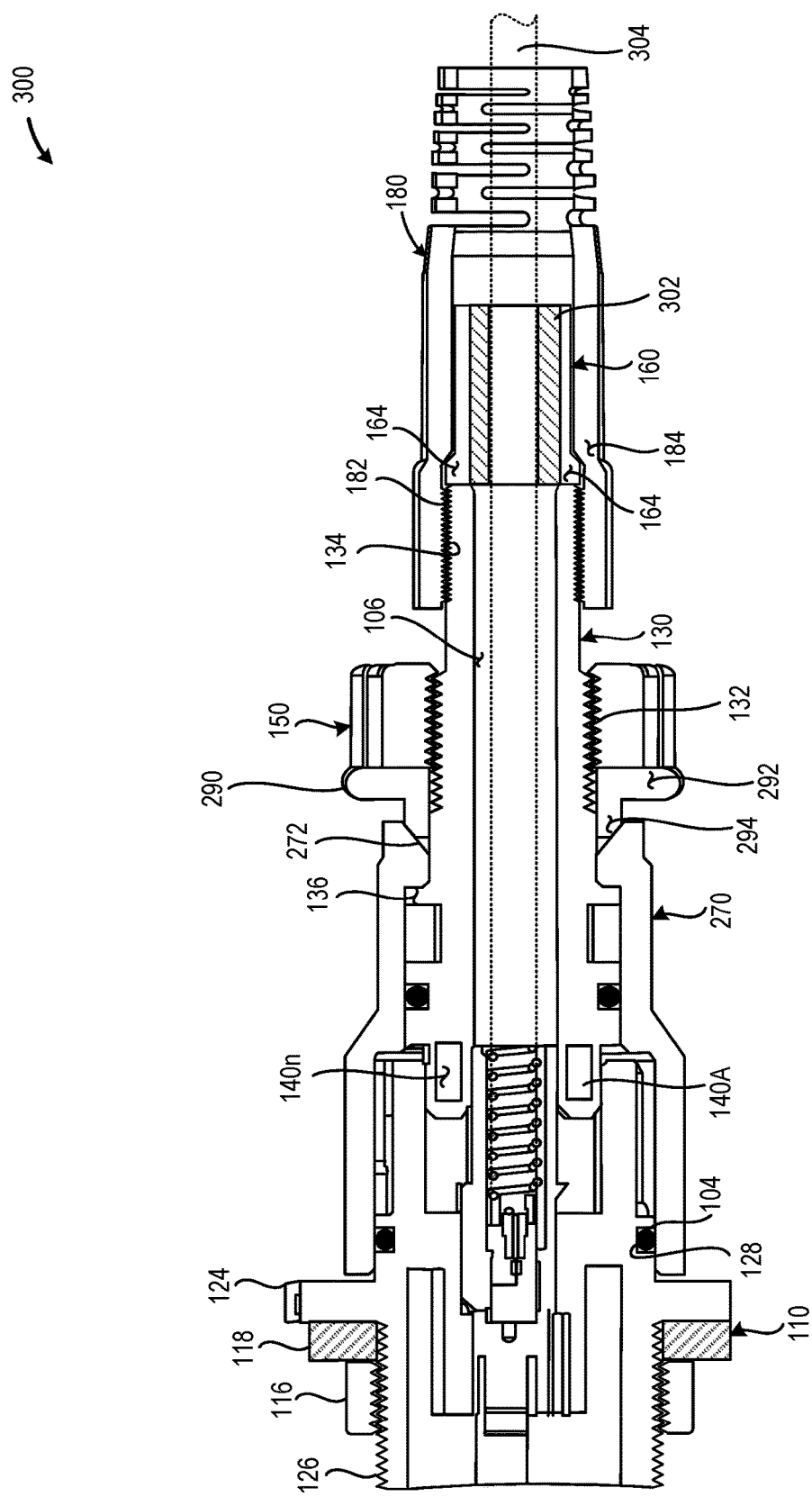
FIG. 3A is a cross-sectional view of another illustrative assembled lockable optical connector 300 depicting the relationship between an adapter member, an inner frame member, a lock member, a tapered-end outer frame member, and a tapered annular compression member disposed about a crimp ring member and an optical fiber stabilizing ring, in accordance with at least one embodiment described herein.
Figure 3B:
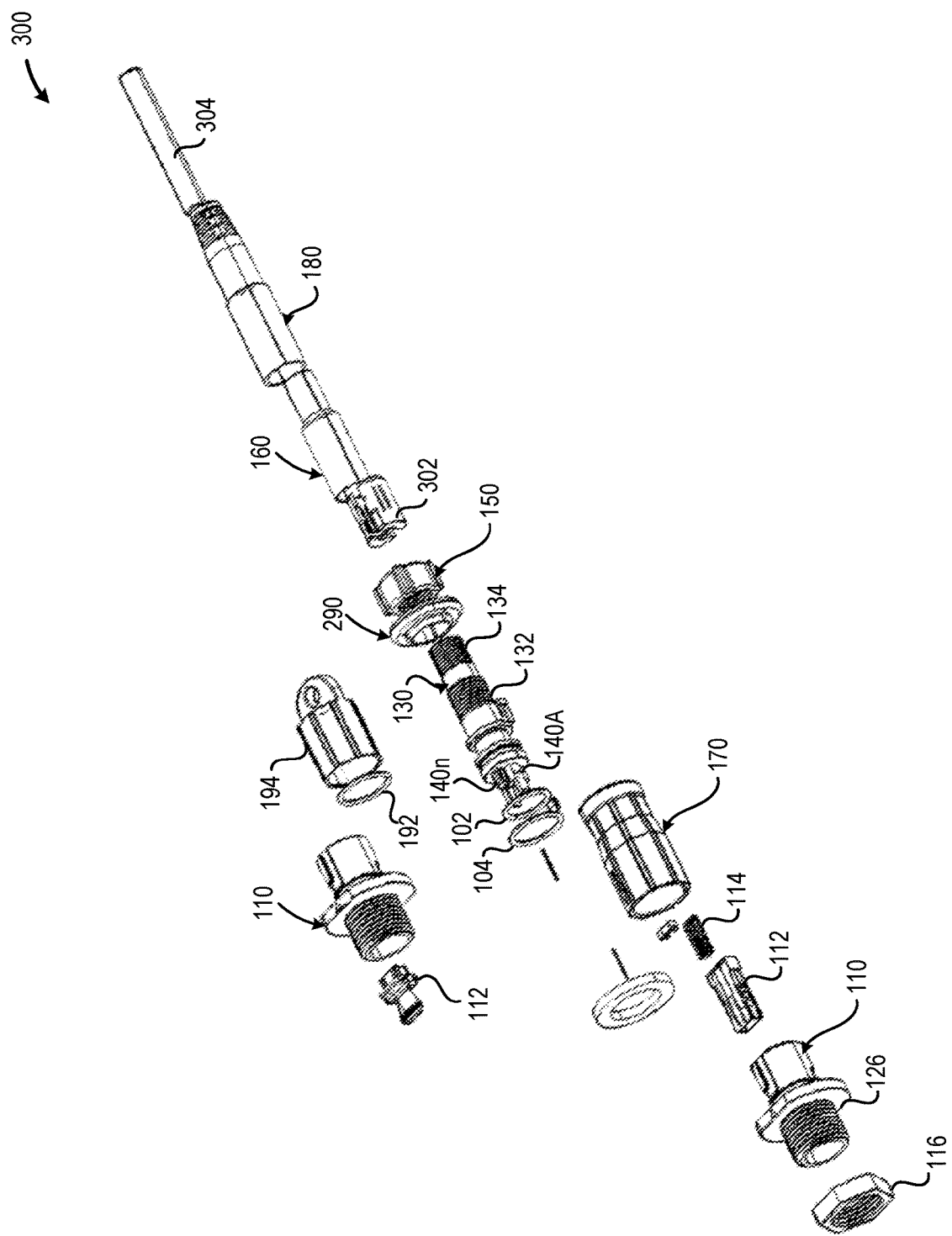
FIG. 3B is an exploded view of the illustrative assembled lockable optical connector in FIG. 3A that more clearly depicts each of the components used in the construction of the optical connector, in accordance with at least one embodiment described herein.

FIGS. 3A and 3B depict another illustrative lockable connector 300. FIG. 3A is a cross-sectional view of another illustrative assembled lockable optical connector 300 depicting the relationship between an adapter member 110, an inner frame member 130, a lock member 150, a tapered-end outer frame member 170, a tapered annular compression member 190, and including a crimp ring member 160 disposed about at least a portion of one or more optical cable stabilizer members 302, in accordance with at least one embodiment described herein. FIG. 3B is an exploded view of the illustrative assembled lockable optical connector in FIG. 3A that more clearly depicts each of the components used in the construction of the optical connector 300, in accordance with at least one embodiment described herein.

Referring to FIGS. 3A and 3B, in embodiments, the one or more optical cable stabilizer members 302 may be disposed about an optical cable 304 routed through channel 106 and at least partially within the crimp ring member 160 such that tightening the tail cover member 180 compresses the the crimp ring member 160 thereby compressing the optical cable stabilizer member 302 about the optical cable 304. In embodiments, the one or more optical cable stabilizer members 320 beneficially stabilizes and reduces the stress on the optical cable 304 disposed within the lockable optical connector 300. In embodiments, the one or more optical cable stabilizer member 302 may include a single or multi-part member. As depicted in FIGS. 3A and 3B, in at least some embodiments, the one or more optical cable stabilizer members 302 may include a two-piece optical cable stabilizer 302. In embodiments, the one or more optical cable stabilizer members 302 may be affixed to the optical cable 304. In other embodiments, the one or more optical cable stabilizer members 302 may be displaceable along the optical cabled 304.

While FIGS. 1A-1E, 2A-2D, and 3A-3B illustrate various operations according to one or more embodiments, it is to be understood that not all of the operations depicted in FIGS. 1A-1E and 2A-2D are necessary for other embodiments. Indeed, it is fully contemplated herein that in other embodiments of the present disclosure, the operations depicted in FIGS. 1A-1E and 2A-2D, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Thus, the present disclosure is directed to a lockable optical connector. The connector includes an adapter member, an inner frame member, an outer frame member, an annular compression member, and a lock member. The inner frame member non-rotatably couples to the adapter member. The outer frame member retains the coupling between the inner frame member and the adapter member and physically couples to the adapter member, to provide a first locking mechanism. The annular compression member is disposed proximate the outer frame member and the locking member couples to the external surface of the inner frame member, compressing the annular compression member against the outer frame member to provide a second locking mechanism. A sealing element may be disposed between the outer frame member and the adapter member and a sealing element may be disposed between the outer frame member and the inner frame member to provide a weather-proof and water-tight lockable optical connector.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing a lockable optical connector.

According to example 1, there is provided a lockable optical connector. The lockable optical connector may include: an adapter member having an internal surface and an external surface; an inner frame member coupleable to the adapter member, the inner frame member having a plurality of protrusions extending longitudinally from the first end of the inner frame member, each of the plurality of protrusions insertable into a respective one of a corresponding plurality of receivers formed in the adapter member; a lock member coupleable to the inner frame member; an outer frame member disposable about at least a portion of an external surface of the inner frame member, a first end of the outer frame member coupleable to a first end of the adapter member to provide a first locking device, the outer frame member including a raised internal surface feature to engage an external surface feature on the external surface of the inner frame member; and an annular compression member disposed about the external surface of the inner frame member and positioned between the outer frame member and the lock member such that when assembled, the compression member is proximate a second end of the outer frame member and the lock member to provide a second locking device.

Example 2 may include elements of example 1 and the connector may further include: a Multi-fiber Push On (MPO) optical connector disposed within the adapter member; and a biasing element disposed between the first end of the inner frame member and the MPO connector, the biasing element to bias the MPO connector to a location distal from the first end of the inner frame member.

Example 3 may include elements of any of examples 1 or 2, and the connector may further include: a tail cover member coupleable to a second end of the inner frame member; and a crimp ring member, disposed inside of the tail cover member, proximate the second end of the inner frame member.

Example 4 may include elements of any of examples 1 through 3 where the tail cover member comprises a tail cover member threadedly coupleable to the second end of the inner frame member.

Example 5 may include elements of any of examples 1 through 4 where the annular compression member comprises an annular compression member having at least one flat surface; and at least a portion of a second end of the outer frame member comprises a flat surface corresponding to the at least one flat surface of the annular compression member.

Example 6 may include elements of any of examples 1 through 5 where the annular compression member comprises an annular compression member having at least one tapered surface; and at least a portion of the second end of the outer frame member comprises a beveled surface corresponding to the at least one tapered surface of the annular compression member.

Example 7 may include elements of any of examples 1 through 6 where the lock member comprises a lock member threadedly coupleable to the external surface of the inner frame member.

Example 8 may include elements of any of examples 1 through 7 where the adapter member includes a recessed surface feature in the external surface of the adapter member, the recessed surface feature proximate the first end of the adapter member; and the outer frame member includes a corresponding raised surface feature to engage the recessed surface feature on the adapter member to couple the outer frame member to the adapter member.

Example 9 may include elements of any of examples 1 through 8 where the recessed surface feature in the external surface of the adapter member comprises an "L" shaped recess extending from the first end of the adapter member.

Example 10 may include elements of any of examples 1 through 9 where the external surface of the adapter member further includes a circumferential groove to at least partially accommodate a first sealing member.

Example 11 may include elements of any of examples 1 through 10 where the first sealing member comprises an O-ring.

Example 12 may include elements of any of examples 1 through 11 where the external surface of the inner frame member further includes a circumferential groove to at least partially accommodate the second sealing member.

Example 13 may include elements of any of examples 1 through 12 where the second sealing member comprises an O-ring.

Example 14 may include elements of any of examples 1 through 13, and the connector may further include a coupling member coupleable to the adapter member.

Example 15 may include elements of any of examples 1 through 14 where the coupling member comprises a coupling member threadedly coupleable to the external surface of the adapter member.

Example 16 may include elements of any of examples 1 through 15 where the adapter member includes a raised collar disposed circumferentially about the external perimeter of the adapter member.

Example 17 may include elements of any of examples 1 through 16, and the connector may further include an annular seal member disposable about the external surface of the adapter member between the coupling member and the raised collar disposed circumferentially about the external perimeter of the adapter member.

According to example 18, there is provided a lockable optical connector. The lockable optical connector may include: an inner frame member having an external surface, a first end, a second end, and a longitudinal cavity formed therethrough, the inner frame member including: a plurality of protrusions extending longitudinally from the first end of the inner frame member; an adapter member having an external surface, a first end, a second end, and a longitudinal cavity formed therethrough, the adapter member including: a raised collar extending circumferentially about an external perimeter of the adapter member; and a plurality of recesses formed in the first end of the adapter member, each of the plurality of recesses to accept the insertion of a corresponding one of the plurality of protrusions extending from the second end of the inner frame member; an outer frame member having an external surface, a first end, a second end, and a longitudinal cavity formed therethrough, the outer frame member disposable about at least a portion of the external surface of the inner frame member and detachably attachable to the adapter member; an annular compression member disposable about the external surface of the inner frame member; and a lock member detachably attachable to the external surface of the inner frame member, the lock member to trap the outer frame member about at least a portion of the external surface of the inner frame member such that, when assembled, the first end of the outer frame member is proximate the raised collar of the adapter member and the second end of the outer frame member is proximate the compression member.

Example 19 may include elements of example 18 where the annular compression member includes at least one flat surface; and at least a portion of the second end of the outer frame member includes a flat surface corresponding to the at least one flat surface of the annular compression member.

Example 20 may include elements of any of examples 18 or 19 where the annular compression member includes at least one tapered surface; and at least a portion of the second end of the outer frame member includes a beveled surface corresponding to the at least one tapered surface of the annular compression member.

Example 21 may include elements of any of examples 18 through 20 where at least a portion of the external surface of the inner frame member includes a first plurality of male threads; and at least a portion of an internal surface of the lock member includes a plurality of female threads such that, when assembled, the detachable attachment of the lock member to the inner frame member occurs when the plurality of female threads in the lock member engage the first plurality of male threads on the surface of the inner frame member.

Example 22 may include elements of any of examples 18 through 21 where the external surface of the adapter member includes a recessed surface feature in the external surface of the adapter member, proximate the second end of the adapter member; and an internal surface of the outer frame member includes a raised surface feature corresponding to the recessed surface feature in the adapter member, such that, when assembled, the raised surface feature on the internal surface of the outer frame member engages the recessed surface feature on the external surface of the adapter member.

Example 23 may include elements of any of examples 18 through 22 where the recessed surface feature in the external surface of the adapter member comprises an "L" shaped recess extending from the second end of the adapter member.

Example 24 may include elements of any of examples 18 through 23 and the connector may further include: a crimp ring member having an external surface, a first end, a second end, and a longitudinal cavity formed therethrough, the crimp ring member detachably attachable to the first end of the inner frame member.

Example 25 may include elements of any of examples 18 through 24 where at least a portion of the external surface of the inner frame member includes a second plurality of male threads; and at least a portion of an internal surface of the crimp ring member includes a plurality of female threads such that, when assembled, the detachable attachment of the crimp ring member to the inner frame member occurs when the plurality of female threads in the crimp ring member engage the second plurality of male threads on the surface of the inner frame member.

Example 26 may include elements of any of examples 18 through 25 where the second plurality of male threads are disposed proximate the second end of the inner frame member.

Example 27 may include elements of any of examples 18 through 26 and the connector may further include: a tail cover member having an external surface, a first end, a second end, and a longitudinal cavity formed therethrough, the tail cover member disposable about at least a portion of the external surface of the crimp ring member.

Example 28 may include elements of any of examples 18 through 27 where the external surface of the adapter member further includes a circumferential groove to at least partially accommodate a first sealing member.

Example 29 may include elements of any of examples 18 through 28 where the first sealing member comprises an O-ring.

Example 30 may include elements of any of examples 18 through 29 where the external surface of the inner frame member further includes a circumferential groove to at least partially accommodate the second sealing member.

Example 31 may include elements of any of examples 18 through 30 where the second sealing member comprises an O-ring.

Example 32 may include elements of any of examples 18 through 31 where the second end of the adapter member to accommodate the detachable attachment of a coupling member and a sealing member.

Example 33 may include elements of any of examples 18 through 32 where at least a portion of the external surface of the adapter member includes a plurality of male threads; and at least a portion of an internal surface of the coupling member includes a plurality of female threads such that, when assembled, the detachable attachment of the coupling member to the adapter member occurs when the plurality of female threads in the coupling member engage the plurality of male threads on the surface of the adapter member to trap the sealing member between the coupling member and the raised collar of the adapter member.

Example 34 may include elements of any of examples 18 through 33 where the external surface of the inner frame member includes an external raised collar extending circumferentially about an external perimeter of the inner frame member; an internal surface of the outer frame member includes an internal raised collar extending circumferentially about an internal perimeter of the of the outer frame member; and wherein when assembled, the internal raised collar in the outer frame member is proximate the external raised collar on the inner frame member.

Example 35 may include elements of any of examples 18 through 34 where the longitudinal cavity in the adapter member accommodates insertion of a Multi-fiber Push On (MPO) optical connector.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. An optical connector, comprising:
an adapter member having an internal surface and an external surface;
an inner frame member coupleable to the adapter member, the inner frame member having a plurality of protrusions extending longitudinally from the first end of the inner frame member, each of the plurality of protrusions insertable into a respective one of a corresponding plurality of receivers formed in the adapter member;
a lock member coupleable to the inner frame member;
an outer frame member disposable about at least a portion of an external surface of the inner frame member, a first end of the outer frame member coupleable to a first end of the adapter member, the outer frame member including a raised internal surface feature to engage an external surface feature on the external surface of the inner frame member; and
an annular compression member disposed about the external surface of the inner frame member and positioned between the outer frame member and the lock member such that when assembled, the annular compression member is positioned between a second end of the outer frame member and the lock member.

2. The optical connector of claim 1, further comprising:
a Multi-fiber Push On (MPO) optical connector disposed within the adapter member; and
a biasing element disposed between the first end of the inner frame member and the MPO connector, the biasing element to bias the MPO connector to a location distal from the first end of the inner frame member.

3. The optical connector of claim 2, further comprising:
a tail cover member coupleable to a second end of the inner frame member; and
a crimp ring member, disposed inside of the tail cover member, proximate the second end of the inner frame member.

4. The optical connector of claim 3 wherein the tail cover member comprises a tail cover member threadedly coupleable to the second end of the inner frame member.

5. The optical connector of claim 1 wherein:
the annular compression member comprises an annular compression member having at least one flat surface; and
at least a portion of a second end of the outer frame member comprises a flat surface corresponding to the at least one flat surface of the annular compression member.

6. The optical connector of claim 1 wherein:
the annular compression member comprises an annular compression member having at least one tapered surface; and
at least a portion of the second end of the outer frame member comprises a beveled surface corresponding to the at least one tapered surface of the annular compression member.

7. The optical connector of claim 1 wherein the lock member comprises a lock member threadedly coupleable to the external surface of the inner frame member.

8. The optical connector of claim 1 wherein:
the adapter member includes a recessed surface feature in the external surface of the adapter member, the recessed surface feature proximate the first end of the adapter member;
the outer frame member includes a corresponding raised surface feature to engage the recessed surface feature on the adapter member to couple the outer frame member to the adapter member.

9. The optical connector of claim 8 wherein the recessed surface feature in the external surface of the adapter member comprises an "L" shaped recess extending from the first end of the adapter member.

10. The optical connector of claim 1 wherein the external surface of the adapter member further includes a circumferential groove to at least partially accommodate a first sealing member.

11. The optical connector of claim 10 wherein the first sealing member comprises an O-ring.

12. The optical connector of claim 10:
wherein the external surface of the inner frame member further includes a circumferential groove to at least partially accommodate the second sealing member; and
wherein the second sealing member comprises an O-ring.

13. The optical connector of claim 1, further comprising a coupling member coupleable to the adapter member;
wherein the coupling member comprises a coupling member threadedly coupleable to the external surface of the adapter member; and
wherein the adapter member includes a raised collar disposed circumferentially about the external perimeter of the adapter member.

14. The optical connector of claim 13, further comprising an annular seal member disposable about the external surface of the adapter member between the coupling member and the raised collar disposed circumferentially about the external perimeter of the adapter member.

15. An optical connector, comprising:
an inner frame member having an external surface, a first end, a second end, and a longitudinal cavity formed therethrough, the inner frame member including:
a plurality of protrusions extending longitudinally from the first end of the inner frame member;
an adapter member having an external surface, a first end, a second end, and a longitudinal cavity formed therethrough, the adapter member including:
a raised collar extending circumferentially about an external perimeter of the adapter member; and
a plurality of recesses formed in the first end of the adapter member, each of the plurality of recesses to accept the insertion of a corresponding one of the plurality of protrusions extending from the second end of the inner frame member;
an outer frame member having an external surface, a first end, a second end, and a longitudinal cavity formed therethrough, the outer frame member disposable about at least a portion of the external surface of the inner frame member and detachably attachable to the adapter member;
an annular compression member disposable about the external surface of the inner frame member; and
a lock member detachably attachable to the external surface of the inner frame member, the lock member to trap the outer frame member about at least a portion of the external surface of the inner frame member such that, when assembled, the first end of the outer frame member is proximate the raised collar of the adapter member and the annular compression member is positioned between the second end of the outer frame member and the lock member.

16. The optical connector of claim 15 wherein:
the annular compression member includes at least one flat surface; and
at least a portion of the second end of the outer frame member includes a flat surface corresponding to the at least one flat surface of the annular compression member.

17. The optical connector of claim 15 wherein:
the annular compression member includes at least one tapered surface; and
at least a portion of the second end of the outer frame member includes a beveled surface corresponding to the at least one tapered surface of the annular compression member.

18. The optical connector of claim 15 wherein:
at least a portion of the external surface of the inner frame member includes a first plurality of male threads; and
at least a portion of an internal surface of the lock member includes a plurality of female threads such that, when assembled, the detachable attachment of the lock member to the inner frame member occurs when the plurality of female threads in the lock member engage the first plurality of male threads on the surface of the inner frame member.

19. The optical connector of claim 15 wherein:
the external surface of the adapter member includes a recessed surface feature in the external surface of the adapter member, proximate the second end of the adapter member;
an internal surface of the outer frame member includes a raised surface feature corresponding to the recessed surface feature in the adapter member, such that, when assembled, the raised surface feature on the internal surface of the outer frame member engages the recessed surface feature on the external surface of the adapter member.

20. The optical connector of claim 19 wherein the recessed surface feature in the external surface of the adapter member comprises an "L" shaped recess extending from the second end of the adapter member.

* * * * *